(12) United States Patent
Ikekame et al.

(10) Patent No.: US 7,154,687 B2
(45) Date of Patent: Dec. 26, 2006

(54) OVERSHOOT CURRENT PHASE/AMPLITUDE CONTROL FOR HARD DISK DRIVE WRITE CURRENT

(75) Inventors: Hiroshi Ikekame, Kokubunji (JP); Takeo Yamashita, Tachikawa (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 75 days.

(21) Appl. No.: 11/041,228

(22) Filed: Jan. 25, 2005

(65) Prior Publication Data

US 2005/0128618 A1 Jun. 16, 2005

Related U.S. Application Data

(63) Continuation of application No. 10/457,473, filed on Jun. 10, 2003, now Pat. No. 6,870,697.

(30) Foreign Application Priority Data

Jun. 24, 2002 (JP) ............................. 2002-182313

(51) Int. Cl.
*G11B 5/09* (2006.01)
(52) U.S. Cl. ..................................................... 360/46
(58) Field of Classification Search ..................... None
See application file for complete search history.

(56) References Cited

U.S. PATENT DOCUMENTS 6,184,727 B1 2/2001 Price, Jr.
6,826,003 B1 * 11/2004 Subrahmanyam ............ 360/46
2003/0223143 A1 12/2003 Fujiwara et al.

FOREIGN PATENT DOCUMENTS

WO     WO 01/29829 A1     10/2000

\* cited by examiner

*Primary Examiner*—Andrea Wellington
*Assistant Examiner*—Dan I Davidson
(74) *Attorney, Agent, or Firm*—Reed Smith LLP; Stanley P. Fisher, Esq.; Juan Carlos A. Marquez, Esq.

(57) ABSTRACT

Devices and methods for generating a magnetic head-specific overshoot current which is combined with an alternating current waveform into a write current used by the magnetic head to store information on a magnetic medium. A processor analyzes the frequency of incoming write data and retrieves from a data table of an overshoot current amplitude and an overshoot current phase. This amplitude and phase information is sent to an overshoot current generator to generate an overshoot current that is responsive to the dynamic impedance properties of a magnetic write head during operation. The data table may have information related to one or many write heads, and the data table may be further subdivided based on additional dynamic characteristics of a write head that may affect the impedance thereof.

6 Claims, 10 Drawing Sheets

Present Invention

Fig.2 Head-gimbals assembly with R/W IC

Fig.3 HDD architecture

Fig.6 Write current waveform and frequency bandwidth

Fig.7 Architecture between R/W channel IC and R/W IC

Fig.8 HDD architecture (Present invention)

Fig.9 Reference data (A)

| Write freq. (MHz) | 50 | 100 | 150 | ... |
|---|---|---|---|---|
| Timing (ps) | 0 | 10 | 16 | ... |
| Ampl.(mA) | 50 | 50 | 55 | ... |

(B)

Timing (ps)

| Write freq. (MHz) | 50 | 100 | 150 | ... |
|---|---|---|---|---|
| Head A | 0 | 10 | 16 | ... |
| Head B | 0 | 0 | 8 | ... |
| ... | ... | ... | ... | ... |

Ampl.(mA)

| Write freq. (MHz) | 50 | 100 | 150 | ... |
|---|---|---|---|---|
| Head A | 50 | 50 | 55 | ... |
| Head B | 40 | 45 | 50 | ... |
| ... | ... | ... | ... | ... |

(C)

Timing (ps)

| Write freq. (MHz) | 50 | 100 | 150 | ... |
|---|---|---|---|---|
| 10 nH | 0 | 2 | 8 | ... |
| 15 nH | 20 | 32 | 88 | ... |
| ... | ... | ... | ... | ... |

Ampl.(mA)

| Write freq. (MHz) | 50 | 100 | 150 | ... |
|---|---|---|---|---|
| 10 nH | 40 | 45 | 55 | ... |
| 15 nH | 55 | 65 | 80 | ... |
| ... | ... | ... | ... | ... |

OVERSHOOT CURRENT PHASE/AMPLITUDE CONTROL FOR HARD DISK DRIVE WRITE CURRENT

This application is a Continuation application of nonprovisional U.S. Ser. No. 10/457,473 filed on Jun. 10, 2003 now U.S. Pat. No. 6,870,697. Priority is claimed based upon U.S. application Ser. No. 10/457,473 filed on Jun. 10, 2003, which claims the priority date of Japanese Patent Application 2002-182313 filed on Jun. 24, 2002.

BACKGROUND OF THE INVENTION

1. Field of the Invention

The present invention relates generally to control systems for hard disk drives, and, more specifically, the present invention provides a circuit for determining and applying an overshoot current ($I_{os}$) with a selected amplitude and timing (phase) to a generated square wave current ($I_{sq}$), which in combination is provided as a write current ($I_w=I_{sq}+I_{os}$) to a write head in a hard disk drive.

2. Description of the Background

In a conventional hard disk drive, one or more magnetic media (disks) are written to and read from by magnetic heads. Typically, to write a certain bit of information to a location on the magnetic medium, a write head is moved over the specified location on the hard disk, while a magnetic field is generated via coils in the magnetic head. A write current is then applied to coils in the write head, causing the magnetic field to be circulated through the hard disk medium, thereby storing information. By rapidly rotating the magnetic media mounted on a spindle, and further by rotating an arm of a gimbal with the magnetic head suspended on the end thereof radially across the surface of the medium, the magnetic head can write a large amount of information in a short amount of time.

To enable the write head to determine when to generate a magnetic field to write information to the magnetic medium, a write current $I_w$ is supplied to the write head. This write current $I_w$ is generally a series of current pulses (pulse train) that arrive at the write head at the moment when the head travels over a location on the magnetic medium to be written to. To enable faster writing, the frequency of the pulse train that makes up the write current $I_w$ needs to be increased. However, as the frequency of the pulses increases, the leading edge of the pulse becomes distorted because "real world" electronics are not able to generate a perfect incoming square wave pulse, and further because the impedance of the write head will deform the pulse (as described more fully below).

To at least partially correct these pulse deformation problems, and to allow for a higher frequency write current $I_w$, an overshoot current $I_{os}$ is typically added to the generated square wave $I_{sq}$, the combination of the two currents becoming the write current ($I_w=I_{sq}+I_{os}$). The overshoot current allows the write pulses to have an decreased (i.e., faster) rise time so that a higher frequency write current can be used to write information with a write head, thereby increasing the speed at which information can be recorded to the magnetic medium.

Figure 10:
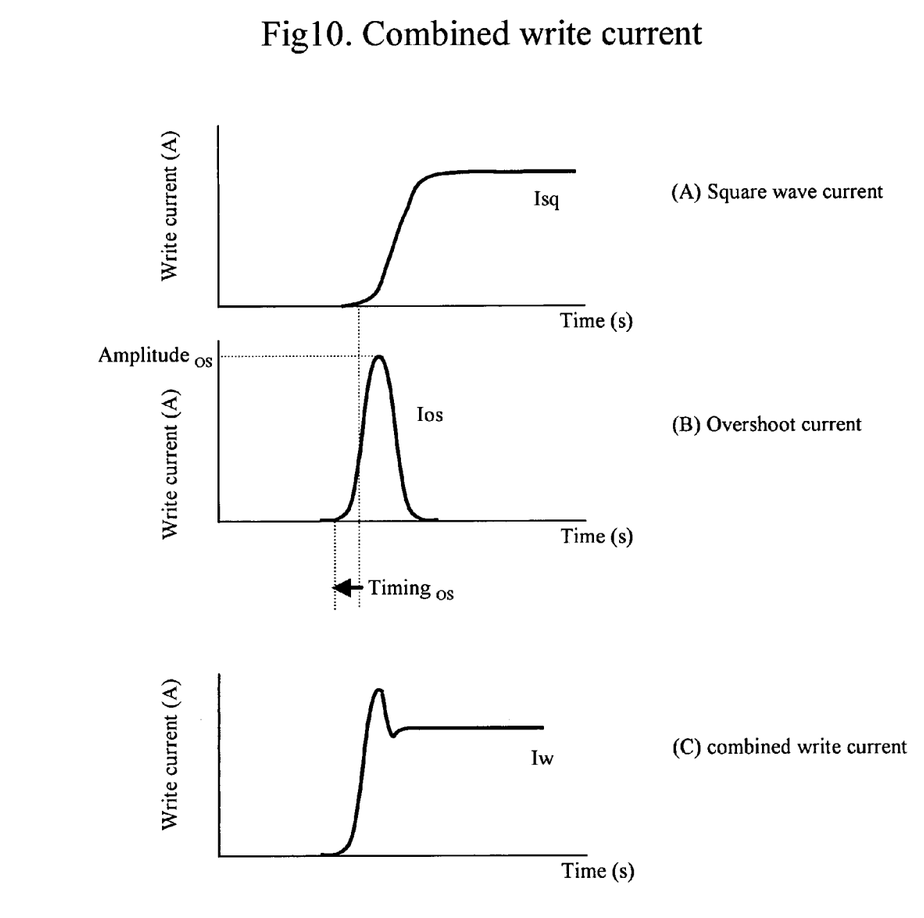

FIG. 10 generally shows this combination of currents. In FIG. 10(B), a square wave current $I_{sq}$ is shown as an imperfect square wave generated by a square wave generator. The rising edge of the square wave current is not a perfect vertical line, and the response of the write head to receiving this signal $I_{sq}$ as the intended write current would not be as intended by the system. FIG. 10(A), therefore, shows an overshoot current $I_{os}$ with a given amplitude (Amplitude$_{os}$) that is generated to correct the deformities in the square wave current $I_{sq}$. FIG. 10(B) shows that the square wave current $I_{sq}$ is combined with the overshoot current $I_{os}$ after some time delay (Timing$_{os}$). In other words, the overshoot current is generated, a small time delay (Timing$_{os}$) is waited, and the square wave current is then combined (via an adder) with the existing overshoot current $I_{os}$. The combined write current ($I_w=I_{sq}+I_{os}$) is shown in FIG. 10(C) as the result of this addition. The resulting write current includes a faster rise time and will cause the write head to perform more closely to the calculated intentions of the system. The amplitude (Amplitude$_{os}$) and the timing or phase (Timing$_{os}$) of applying the overshoot current are both predetermined and fixed in current systems.

Figure 4:
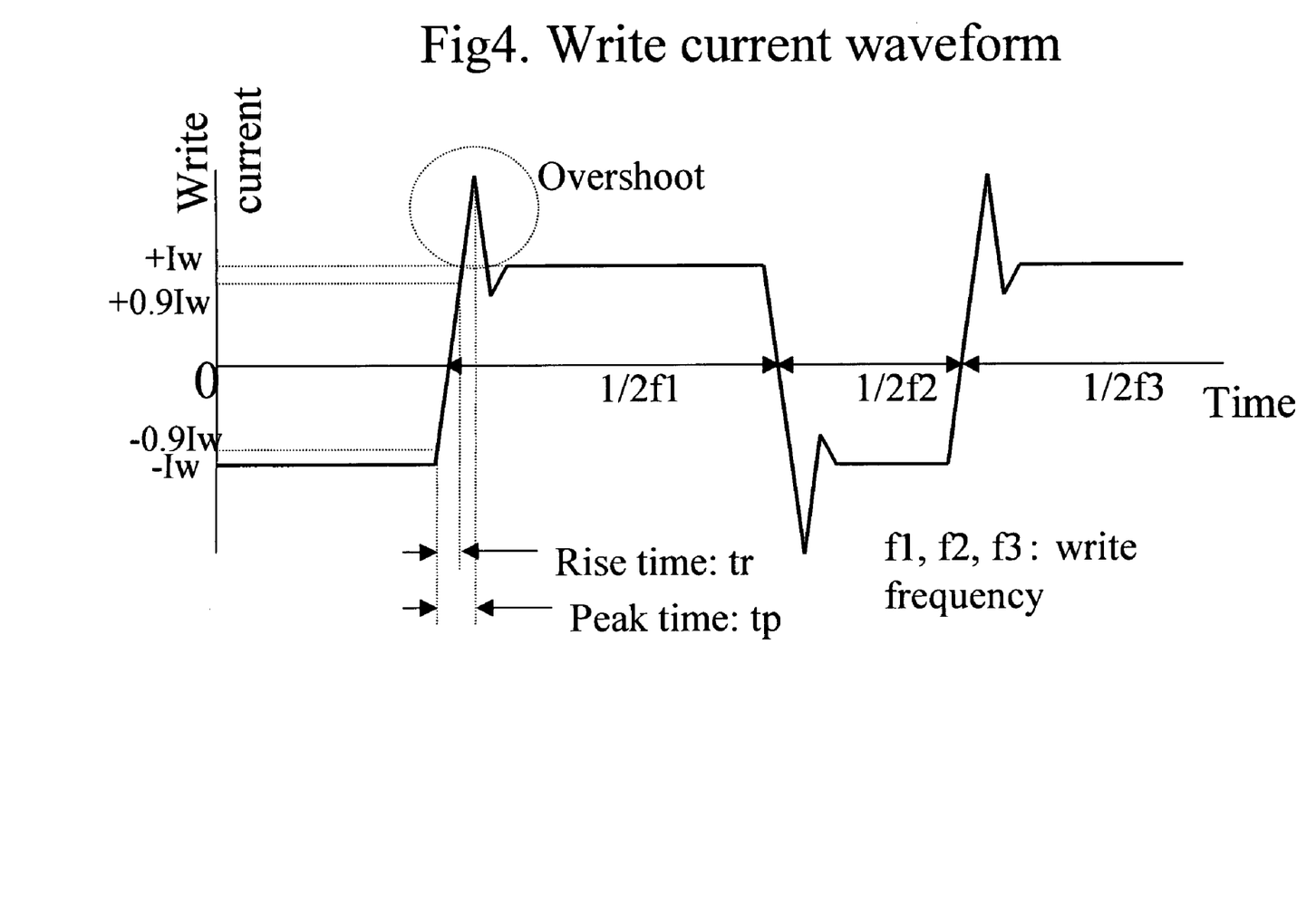
FIG. 4 shows a write current waveform used by a write head to store information on a magnetic disk medium.

The main problem with this conventional overshoot addition is that the write pulses do not occur at the same frequency, and that the write head will respond differently (e.g., has a different impedance) at these different frequencies. This aspect is depicted in FIG. 4. FIG. 4 shows an exemplary write current waveform showing one complete write current pulse and the front half of a second write current pulse. As seen in the drawing, the initial write current pulse (square wave) has a write frequency of f1 (wherein the period of the pulse itself is only half of this value, or $1/(2f_1)$). An overshoot current has been added to the square wave current to correct for the distortion caused by the impedance of the write head. The time delay between the initial current pulse and next current pulse has a frequency of $f_2$ (period of $1/(2f_2)$), and the next write current pulse has yet another frequency $f_3$ (period of $1/(2f_3)$). Therefore, each pulse (and time period between pulse) may have a separate frequency. The overshoot current amplitude and timing (phase) is not conventionally adjusted to account for these different frequencies.

Figure 5:
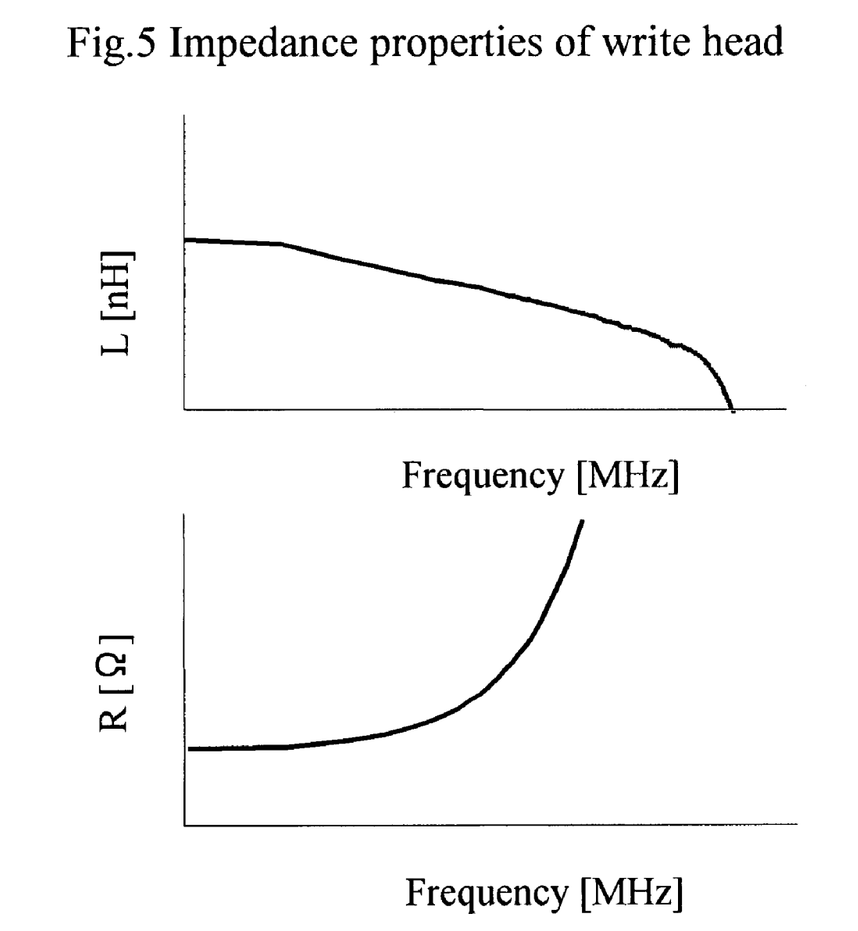
FIG. 5 shows the relationship between various impedance properties of a write head versus operational frequency.

The multiple frequency problem occurs because the write head has a different impedance at different write data frequencies, and this impedance difference will distort the incoming write data current in different ways (see generally, FIG. 5). Therefore, a single overshoot current of a fixed amplitude and a fixed timing will not properly correct the distortion in the square waveform current at all possible operating frequencies. Instead, the applied overshoot current amplitude and timing of application should be altered with each incoming write current pulse to maximize the chance that the write head will correctly store information in the magnetic medium. Solutions in this vein are desired.

SUMMARY OF THE INVENTION

In at least one preferred embodiment of the present invention, a device and method are provided for adjusting the amplitude and timing of an overshoot current $I_{os}$ that is combined with a generated square wave current $I_{sq}$ (or current "pulse") to produce a write current $I_w$ in a write head for a magnetic recording medium. Because the impedance of the write head changes at different writing frequencies, the write current waveform should be adjusted in a way that takes these impedance differences into account. Changing the offshoot current amplitude and timing characteristics is one way to accomplish this result.

A hard disk drive according to the present invention preferably analyzes the incoming write data (data to be written to the magnetic medium) and uses a processor to continuously calculate the frequency of this incoming write data. This obtained frequency information is then used by the processor to access a stored data reference table that correlates each potential write data frequency to an overshoot current amplitude and timing for each head in a hard disk drive. The reference table may be stored in a memory such as a RAM (Random Access Memory) or a ROM (Read Only Memory), in an administration section of the hard disk drive medium, in a series of data latches or registers, or in any other storage medium.

The reference table may include data for just one single write head or for a plurality of different heads. If data is stored for a plurality of different heads, these heads may represent all of the write heads used with the particular magnetic mediums installed in the present hard disk, or they may represent all of the heads with a certain property or characteristic. With the latter scenario, the same data reference table could be installed in a wide variety of hard disk drives using a wide variety of write heads, even though each particular disk drive would only use a portion of the total reference table. Such a system may reduce fabrication costs for the manufacture of the reference table.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 6 depicts a low frequency current waveform 6(A), ideal 6(B) and actual 6(C) high frequency current waveforms, and the corresponding frequency bandwidths 6(D);

FIG. 7 shows a conventional architecture for an R/W Channel IC and an R/W IC 7(A) and an R/W Channel IC and an R/W IC according to the present invention 7(B);

FIG. 9 shows exemplary reference tables that hold one 9(A) or multiple 9(B) relationships between a write data frequency and overshoot current amplitude and timing information or other write head characteristics 9(C); and FIG. 10 shows exemplary current waveforms in a hard disk drive including a square wave current $I_{sq}$ 10 (A), an overshoot current $I_{os}$ 10 (B), and a combined write current $I_w$ 10 (C).

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Figure 3:
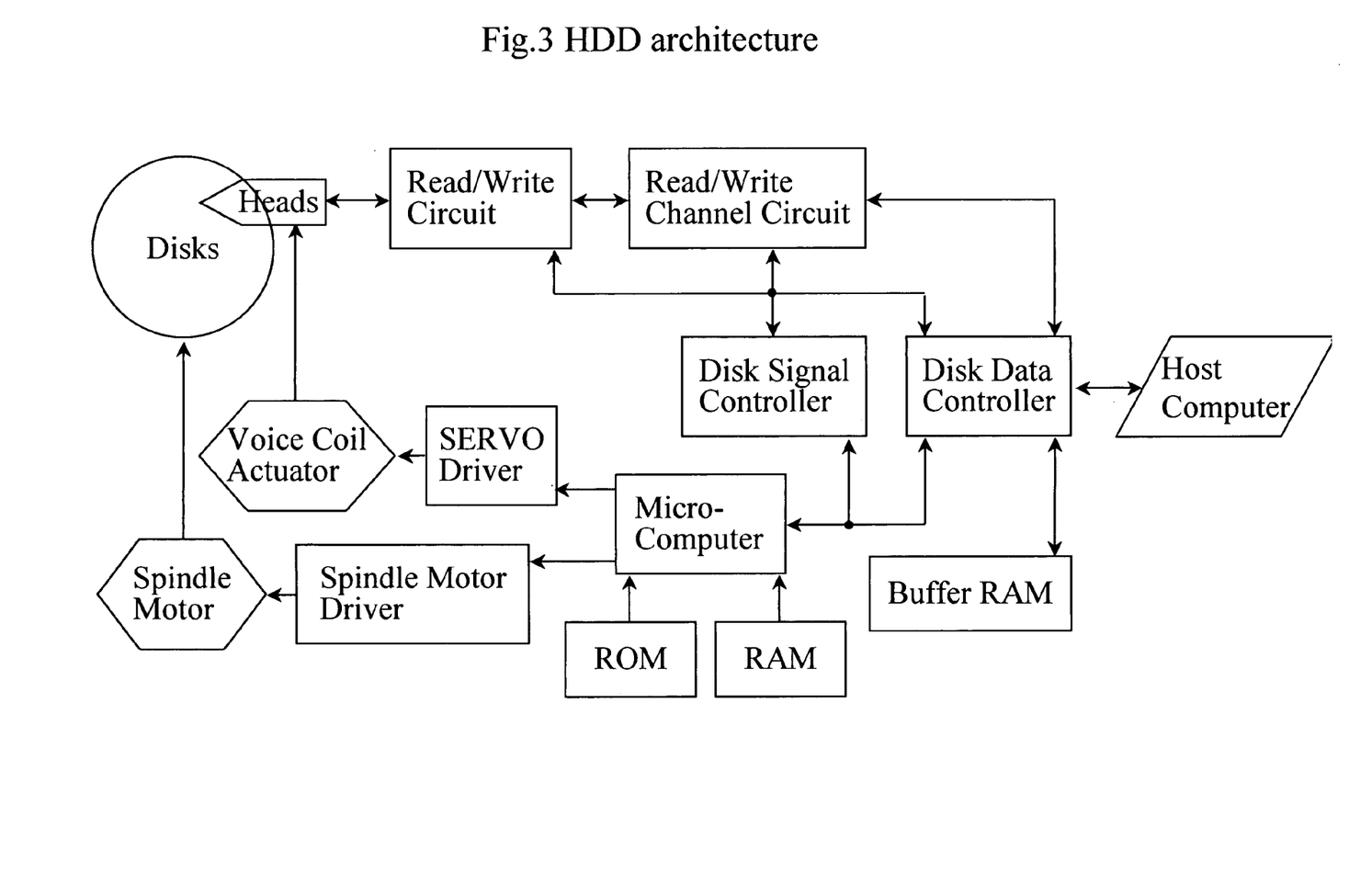
FIG. 3 shows a system block diagram of a conventional hard disk drive.

FIG. 3 generally indicates a system block diagram for a conventional hard disk drive. Two way communication to and from the hard disk drive occurs from a host computer, generally via some type of computer bus such as an IDE, EIDE or SCSI bus. The information sent to and received from the host computer is received by the disk data controller, which may use a buffer RAM to facilitate communication of large amounts of data.

The disk data controller is connected to a Read/Write Channel Circuit ("R/W Channel IC"), a Read/Write Circuit ("R/W IC"), a disk signal controller, and a microcomputer (sometimes referred to herein as a "processor") capable of performing various calculations and operations on the data to be written to and read from the magnetic disk medium. Generally speaking, the disk data controller and the disk signal controller work with the R/W Channel IC, the R/W IC, and the microcomputer to generate all of the signals used to write information to or read information from the hard disk. These signals include the write current signals sent to the write head to write data to the hard disk, as well as the control signals that rotate the hard disk mounted on a spindle and move the magnetic head radially across the surface of the hard disk by rotating the arm on which the magnetic head is mounted. The microcomputer may be connected to one or more RAMs (Random Access Memory) and/or ROMs (Read Only Memory) to facilitate the various calculations that are necessary to write data to and read data from a magnetic medium.

In order to rotate or spin the magnetic media that are mounted on a spindle, the microcomputer is connected to a spindle motor driver and a spindle motor. By controlling the spin of this spindle, the microcomputer controls the speed at which the magnetic head flies over the magnetic disk, and hence, the speed at which information can be written to the disk. There is also a SERVO driver and a voice coil actuator connected to the processor. The SERVO driver and the voice coil actuator provide the rotational movement of the arm of the hard disk that includes the magnetic head attached thereto. This arm allows for radial movement of the magnetic head over the surface of the magnetic medium.

Data to be written to the magnetic medium is received from the host computer and is transferred to the R/W Channel IC. The write data is then sent from the R/W Channel IC to the R/W Circuit where it is converted into a write current that is sent to the write head to store information on the magnetic medium. More specifically, the R/W Channel IC feeds this write data to a square wave (or other alternating wave profile) current generator in the R/W IC, which generates a square wave current at a frequency determined by the write data received from the R/W Channel IC.

The R/W IC also includes an overshoot current generator which is synchronized to the square wave current generator. The generated square wave current $I_{sq}$ is then combined (via an adder circuit) with a generated overshoot current $I_{os}$ which, when combined, becomes the write current $I_w$ that is sent to the write head to be used to write data to the magnetic disk medium. In this conventional embodiment, the overshoot current amplitude and the timing for applying the overshoot current is predetermined and is not based on the frequency of the incoming write data. Because the characteristics of the write head change as the write data frequency changes (as described more fully below), this inability to change is not preferred.

As generally described above, the write current $I_w$ for a hard disk drive magnetic head is ideally a square wave current that can be produced from a square wave generator within the hard disk drive circuitry. FIG. 5 shows a relationship between the impedance properties of an exemplary write head versus the frequency of the write data applied to the write head. As shown in FIG. 5, the resistance of a write head at high frequencies increases, and the inductance of the write head decreases at high frequencies. Therefore, at high operational frequencies, the impedance properties of the write head will distort the write current waveform such that the current is no longer ideal to facilitate writing to the hard disk medium. Thus, the write head is considered to have a narrow write frequency band because high frequency write currents $I_w$ may not be effectively used. This problem becomes even more pronounced when it is considered that each write head will perform differently (have different impedance values) at high frequencies. Therefore, correcting for the write current distortions is hindered.

As a partial solution to minimize the write current distortions caused by the write head impedance, the square wave current $I_{sq}$ generated from a square wave generator is combined with on overshoot current $I_{os}$ to create the actual write head current $I_w$, according to:

$$I_w = I_{sq} + I_{os}$$

This overshoot current $I_{os}$ compensates for the distortion of the square wave $I_{sq}$ current by decreasing the rise time and increasing the amplitude of the initial portion of the square wave current pulse (as described in more detail above).

In conventional applications, however, this overshoot current $I_{os}$ is generated by an overshoot generator at a fixed amplitude and the timing (phase). So timing in which this overshoot current $I_{os}$ is applied to the square wave current $I_{sq}$ is also fixed. The combination is based only on the synchronization between the square wave generator and the overshoot current generator. Because the write head has different impedance characteristics at different operational frequencies, the distortion of the square wave $I_{sq}$ will vary at different write current frequencies. Therefore, the overshoot current $I_{os}$ application at fixed times and at fixed amplitudes will not properly correct the high frequency distortion problem for all cases. Additionally, as different write heads are used, each with its own unique high frequency impedance characteristics, again the fixed overshoot current will not properly correct the distortion.

Figure 6:
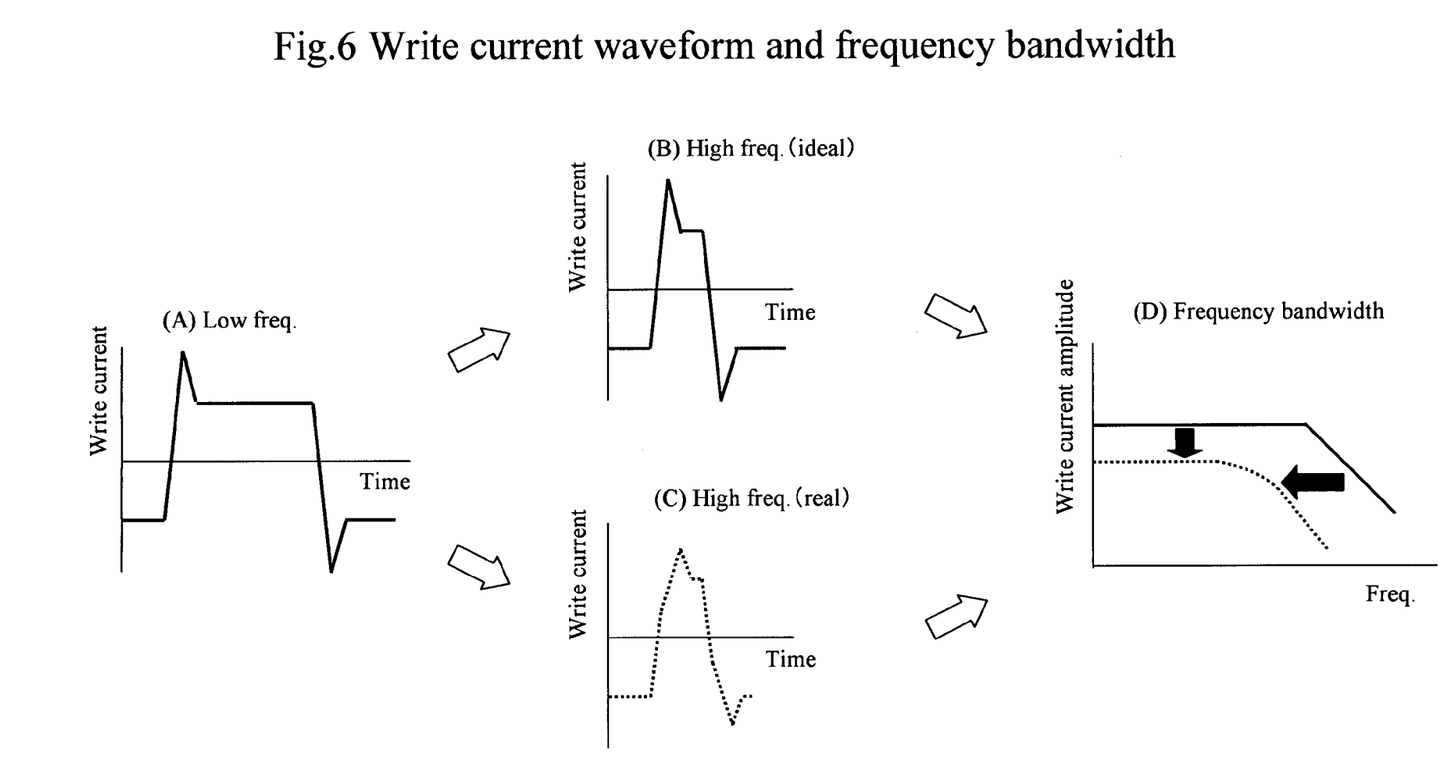

FIG. 6 further exemplifies the high frequency distortions of write currents $I_w$ in write heads for magnetic media. At low frequencies (shown in FIG. 6(A)), the write current resembles a square wave with an added offset (in this embodiment, "offset" means overshoot) intended to decrease the rise time of the non-ideal square wave. As write currents of higher frequencies are presented to the write head, the impedance properties of the write head at high frequencies distort the write current. Ideally (FIG. 6(B)), at high frequencies, the write current will resemble the low frequency write current waveform, except with a shorter pulse width. The added overshoot current will enable a quick response time. However, in actual current write heads (FIG. 6(C)), the high frequency impedance properties of the write head distort the current waveform such that the rise time is increased to an unfavorable amount.

FIG. 6 also shows the result of these high frequency distortions. FIG. 6(D) shows the resultant write current amplitude across various write data frequencies (i.e., write current frequency band). The dotted line represents the actual frequency response (from FIG. 6(C)) and the solid line represents the more ideal response that is depicted in FIG. 6(B). The impedance of the write head at high frequencies causes a contraction of the write current frequencies that may be used with the write head. Under ideal conditions, the write current frequency band would be expanded to that shown in the solid line in FIG. 6(D).

Figure 7:
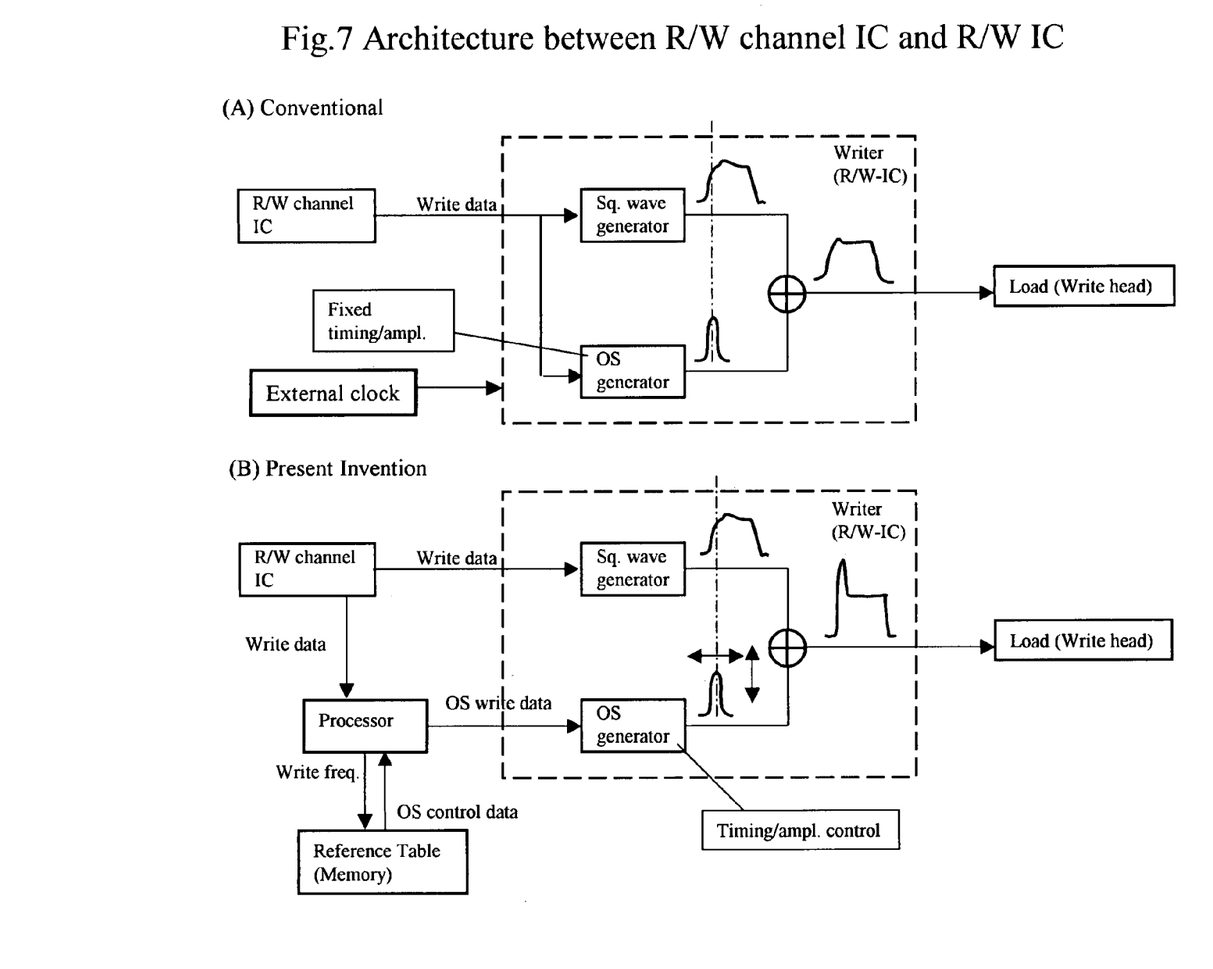

FIG. 7 details exemplary models of the write current generating circuitry in the R/W IC and its connection with the R/W Channel IC. FIG. 7(A) shows a conventional R/W IC circuit and interconnection, and FIG. 7(B) shows an exemplary R/W IC circuit and interconnection according to at least one preferred embodiment of the present invention.

As seen in FIG. 7(A), the conventional R/W IC receives write data information from the R/W Channel IC which describes data to be written to hard disk medium via the magnetic write head. This write data is then transformed by the R/W IC into a write current $I_w$ that is provided to the write head. A square wave current generator then creates a plurality of square wave current pulses that correspond to the write data information received from the R/W Channel IC. The generated square wave current represents the "ideal" information to be written to the magnetic hard disk medium.

Because of the high frequency impedance characteristics of the write head which will deform this ideal square wave, the R/W IC also includes an overshoot current generator that generates an overshoot current $I_{os}$ that is added to the generated square wave current $I_{sq}$ to produce a combined write current $I_{os}$ which is provided to the write head. In the conventional hard disk drive circuit shown in FIG. 7(A), this overshoot current is set at a predetermined amplitude and predetermined timing (phase) such that the overshoot current is always created in the same way. The square wave current generator and the overshoot current generator is fabricated in a Read Write IC. The square wave current generator and the overshoot generator are synchronized such that the overshoot current will get added to the generated square current according to a predetermined delay time. Specifically, the R/W IC is connected to the external clock and the output of the R/W Channel IC in such a way that the timing of the output of the overshoot current and then the square wave current (after a short delay time) is synchronized by this external clock. In essence, regardless of the frequency of the generated square wave or the impedance of the write head, the same overshoot current with the same amplitude and phase will be used. Because the impedance of the write head changes at different operating frequencies, and further because different write heads have different impedance characteristics, this circuit is not ideal to enable proper writing of information to the magnetic medium.

FIG. 7(B) shows one exemplary embodiment of an R/W-IC and interconnection according to the present invention. The square wave current generator again receives the write data information from the R/W Channel IC to produce square wave current pulses that correspond to this write data to be written to the write head. However, rather than applying a predetermined amplitude/timing overshoot current to this generated square wave current, the present invention preferably processes the received write data and generates an overshoot current that matches the operating characteristics (e.g., impedance) of the write head at the current operating frequency (based on the analyzed write data frequency).

More specifically as shown in FIG. 7(B), the R/W Channel IC is also connected to a processor which receives the write data and analyzes the data to determine the frequency of the write data. This frequency changes as different data is to be written to the hard disk drive, and the processor preferably continuously analyzes the incoming write data to determine the write data frequency at that particular time.

The processor is also communicatively connected to a memory, which may be a RAM or ROM, an administration portion of the hard disk medium, a register or latch, or any other type of electronic storage medium. This storage medium preferably includes a data reference table that stores a relationship between various different write data frequencies and the amplitude and timing (phase) of an overshoot current that should be added to a square wave current pulse to most effectively write data to a magnetic medium using the write head. In other words, rather than adding a predetermined and unchanging overshoot current to the generated square wave current pulse, the present invention is able to analyze a local frequency of the write data and add a specific overshoot to the write data that compensates for the change in impedance of the write head at different write data frequencies.

Returning to FIG. 7(B), after the processor calculates the current write data frequency and retrieves the corresponding overshoot timing and amplitude values from the overshoot data reference table, this overshoot amplitude and timing information is preferably sent to the overshoot current generator which thereafter generates an overshoot current with the selected characteristics. In the same way as in FIG. 7(A), the overshoot current $I_{os}$ is combined with the square wave current $I_{sq}$ to create the write current $I_w$ that is sent to the write head (represented by the load in FIG. 7). By this analysis and selection method, the R/W IC of the present invention is able to provide a more accurate write data waveform to the write head of a hard disk drive, and to enable more accurate writing of information to a magnetic medium.

The use of this general algorithm creates desirable write current properties with a wider write frequency band for a write head than the conventional hard disk drive devices. This favorable response is independent of head impedance changes due to write data frequency changes. This method is also useful for different write heads with different impedance characteristics. This method may also be independent of an impedance change that occurs due to write head heating during operation or any other characteristic of the write head that may change the write head inductance as long as this changing characteristic is made part of the reference data table as described more fully below.

Figure 9:
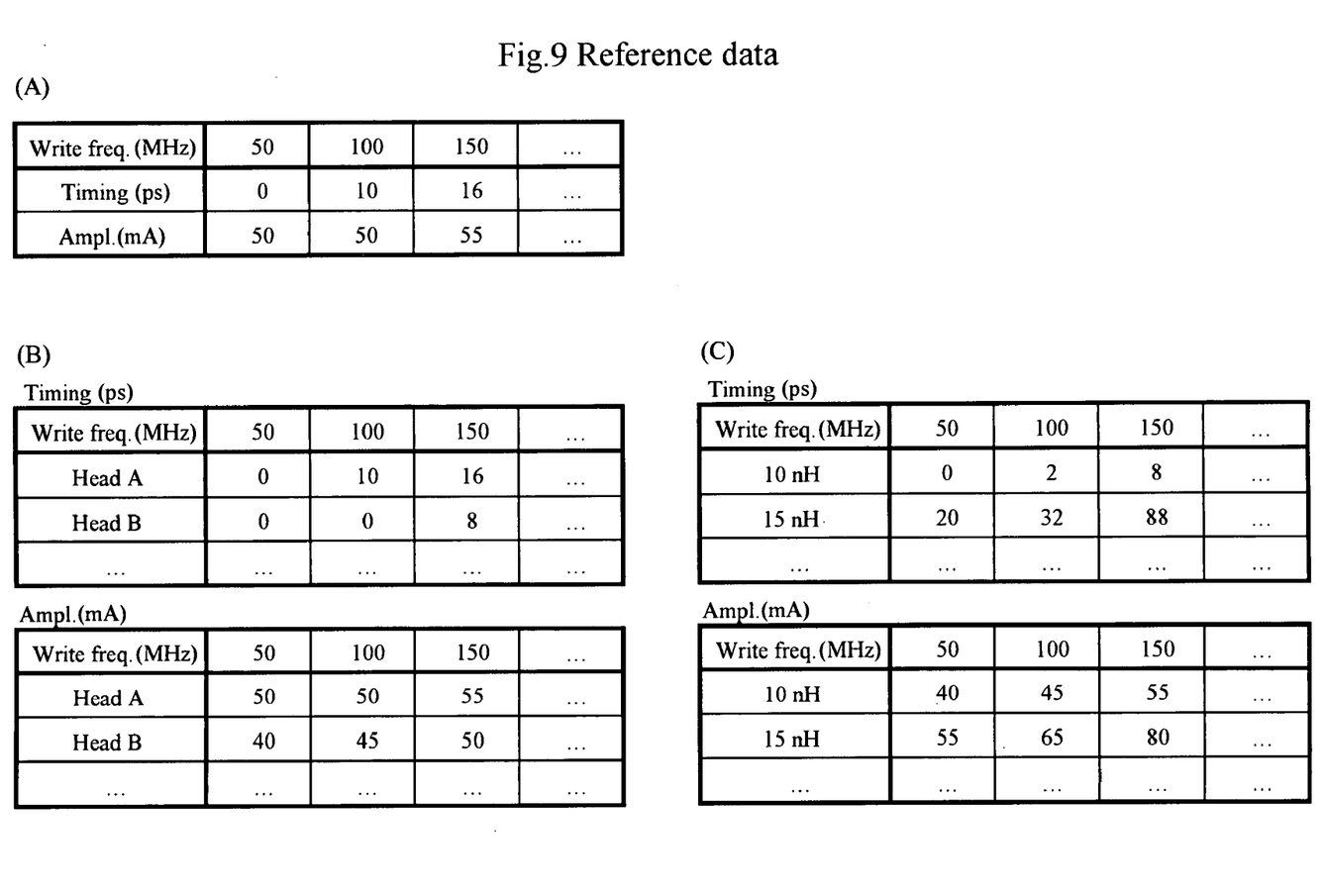

FIG. 9 shows three exemplary embodiments of an overshoot reference data table for use with the present invention. This table preferably provides a relationship between the frequency of the write data received by the R/W IC and the amplitude and timing of the an overshoot current waveform that should be added to a square wave current $I_{sq}$ to produce the write current $I_w$. Generally speaking, these values are labeled "Amplitude$_{os}$" and "Timing$_{os}$" in FIG. 10. FIG. 9(A) shows a reference table in which each write data frequency corresponds to a single delay timing (in picoseconds) and a single overshoot amplitude (in milliamps). FIG. 9(B) shows this table adapted so that each frequency of write data is associated with a specific timing and amplitude for a plurality of different write heads (Head A, Head B, etc.). FIG. 9(C) shows alternative write head characteristics that may be made a part of the reference data table.

FIG. 9(A) shows the simplest form of the reference data table. For each of the write data frequencies (e.g., 50 MHz, 100 MHz, 150 MHz) there is a corresponding timing and a corresponding amplitude. The overshoot waveform is generally a pulse, wherein the amplitude represents the intensity of that pulse in milliamps. The overshoot is also combined with the generated square wave at a certain time delay which is represented as the timing in picoseconds. The values for the timing increase as the write data frequency increases. In this embodiment, these values means ahead of time in which the overshoot current should be combined to square wave current. Therefore, these values have negative.

As seen in FIG. 9(A), the values for the amplitude and the timing generally increase as the write data frequency increases, but any relationship may be employed using this table. Additionally, the selected write data frequency values are exemplary only, and various values could be stored in the reference data table depending on the specific write head employed or other factors.

FIG. 9(B) shows an expansion of the table in FIG. 9(A). In the reference data table of FIG. 9(B), there are two separate tables, one corresponding to the timing of the overshoot current and one corresponding to the amplitude of the overshoot current. For each incoming write data frequency determined by the processor, there are a plurality of different timing and amplitude values labeled Head A, Head B, etc. These different head values correspond to different write heads that have different operating characteristics (e.g., different impedance values). For example, these different heads could correspond to different write heads that exist in the same hard disk. In this way, depending on which write head is currently being used for a write operation, the processor could locate the appropriate head in the reference data tables and determine the timing and amplitude for that head at the calculated operating frequency.

Alternatively, these multiple heads may just represent all of the possible write heads that may be used in a certain hard disk drive, or in a plurality of hard disk drives, for example that share a certain characteristic. A ROM that holds the data table could then be used in a variety of different hard disks with a variety of different write heads. Even though every line in the table may not be used in each manufactured hard disk drive, the fabrication of the ROM holding the data table would be less expensive because the same table could be repeatedly fabricated. In this way, the reference data table could be mass produced and flexible.

FIG. 9(C) shows an exemplary reference data table that includes additional characteristics used to determine the overshoot current amplitude and phase. For example, because of write head heating during operation or some other reason, the inductance of the write may change based on more than just the frequency of the write data. Therefore, the reference data table of FIG. 9(C) shows that two characteristics, the frequency of the write data and a measured inductance of the write head due to other factors, are both used to select an overshoot current amplitude and overshoot current timing. This table is exemplary and any combination of inductance-altering factors may be used.

Figure 8:
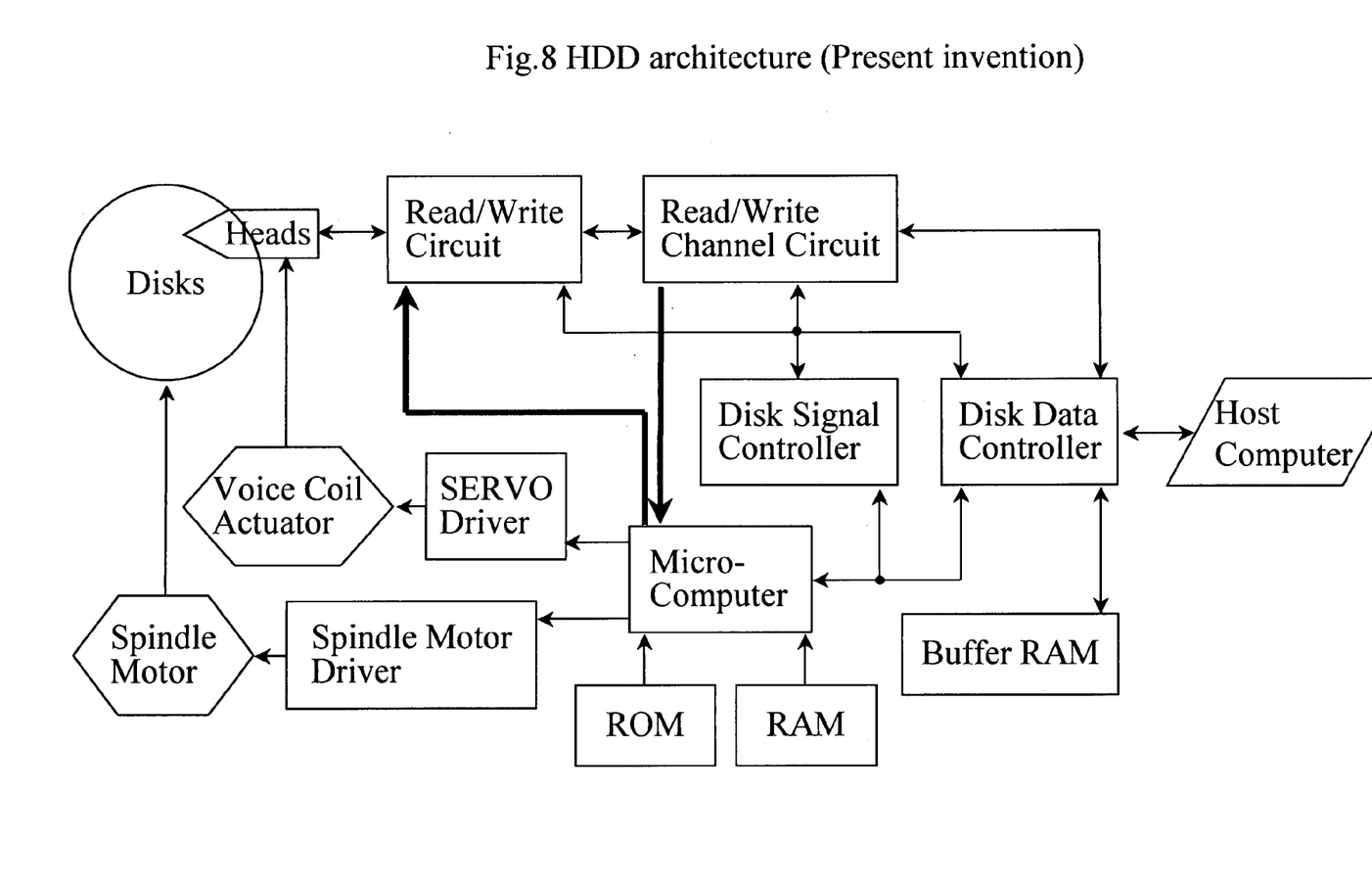
FIG. 8 shows a system block diagram of a hard disk drive according to the present invention.

Looking now at FIG. 8, a high level system block diagram of a hard disk drive according to at least one presently preferred embodiment of the invention is shown. In most respects, this system block diagram is the same as that shown in FIG. 3 and described above. As in that case, two way communication with a host computer is facilitated through a disk data controller and a buffer RAM. Thereafter, the disk data controller, the disk signal controller, the R/W Channel IC, the R/W IC, and a microcomputer work together to provide the physical movement and logical signals needed to read and write data from and to the hard disk medium.

FIG. 8 also shows two new communications lines 50, 52 shown in bold in the diagram. These lines allow communication from the R/W Channel IC to the microcomputer (processor) 50 and from the microcomputer to the R/W IC 52. As described more completely above, the first of these two new communications lines 50 allows for the microcomputer to receive the write data information that is sent from the R/W Channel IC to the R/W IC. The microcomputer then analyzes this write data to determine its frequency. The microcomputer may then reference a data table in an associated memory device (RAM or ROM) or from an administration section of the hard disk medium itself, to retrieve an appropriate overshoot current amplitude and timing for the detected write data frequency. Once retrieved from the reference table, this overshoot current amplitude and timing (phase) information are sent over the second of the new communication lines 52 from the microcomputer to the R/W IC.

Specifically, the overshoot information is sent to an overshoot current generator circuit so that the overshoot generator may create an overshoot current that is specifically designed for the write head operating characteristics at the write data frequency. Within the R/W IC, a generated square wave current $I_{sq}$ and the generated overshoot current $I_{os}$ are then combined into a write current $I_w$ that is sent out to the write head to enable the write head to record information on the magnetic recording medium. In this way, a more accurate write current may be sent to the write head so that the write head can more accurately record information in the hard disk drive.

Figure 1:
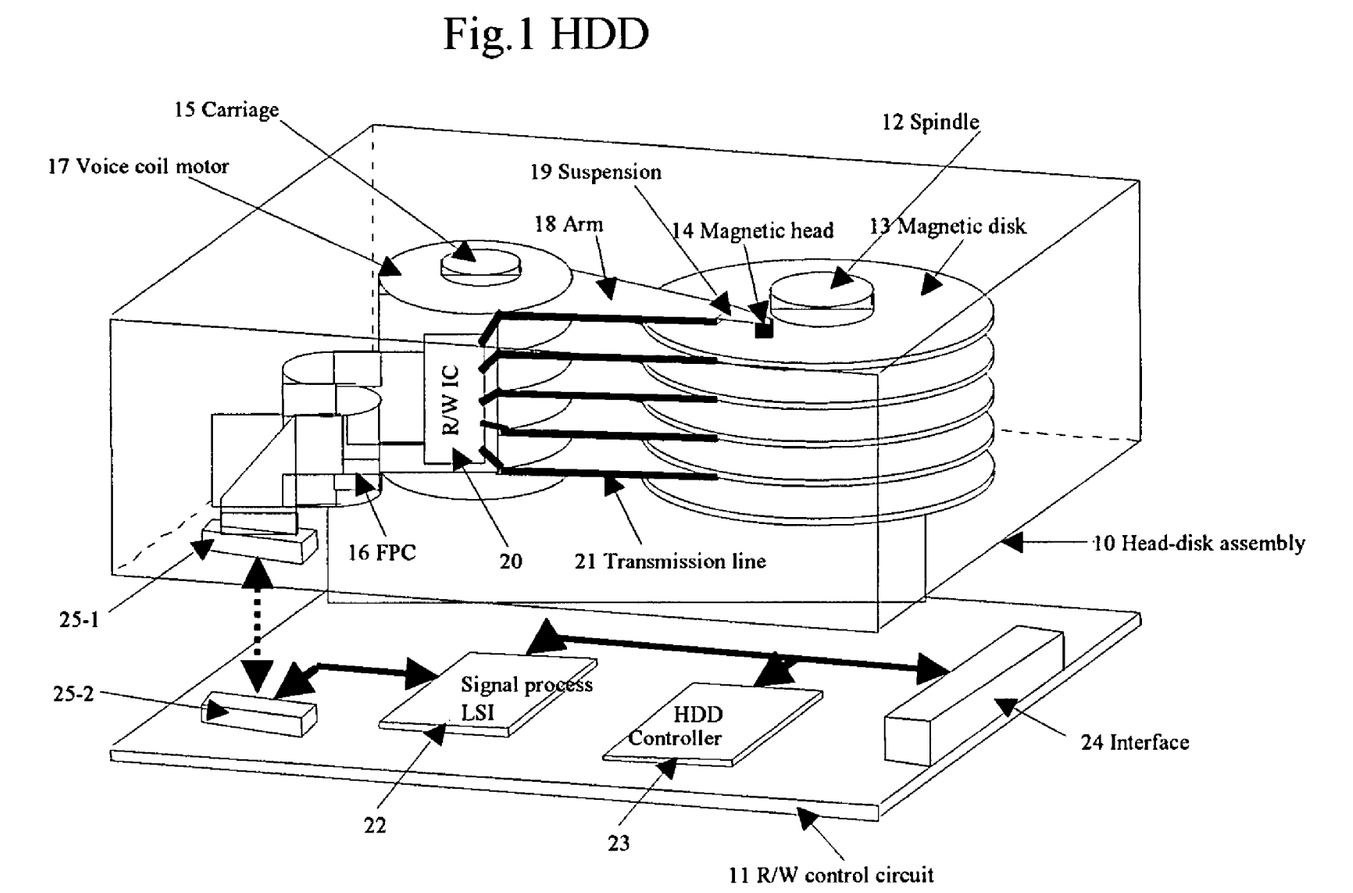
FIG. 1 shows a perspective view of a hard disk drive system.

The present invention may be incorporated into a variety of different hard disk drives in a variety of different ways. For example, FIG. 1 shows one presently preferred embodiment of hard disk drive incorporating the present invention therein. FIG. 1 generally shows the head-disk assembly 10 and the R/W control circuit 11. The R/W control circuit 11 provides the interface between the hard disk drive and the rest of the computer system, and provides the signal processing and control functionality to the hard disk drive.

The R/W control circuit 11 includes an interface 24 which connects (typically by cable) to the bus of the computer system. This interface 24 is connected to the hard disk drive controller 23 (HDD controller) and a signal processing LSI 24 (Large Scale Integrated circuit). Together, the HDD controller 23 and the signal processing LSI 22 provide the logical interface between the computer system and the stored contents of the hard disk. These component process data that is to be written to or read from the hard disk, and they control the various hard disk drive components (e.g., the voice coil motor 17, the arm 18, and the spinning of the medium 13) to enable the reading from and writing to the hard disk drive.

The head-disk assembly 10 is connected to the R/W control circuit 11 via matching interfaces 25-2 and 25-1. The signal from the R/W control circuit 11 is sent to the FPC 16. The head-disk assembly 10 includes a carriage 15 and a plurality of arms 18 that hold a suspension 19 with a magnetic head 14 at the end of the suspension and arm. The head-disk assembly 10 also includes a spindle 12 and a plurality of magnetic disks 13 (five shown) wherein the spindle rotates the magnetic disks at a high speed so that the magnetic head 14 travels across the disk. As the magnetic disk 13 spins, the carriage 15 rotates the arm 18 (via the voice coil motor 17) which moves the magnetic head 14 in a radial direction across the magnetic medium 13. Coupled with the rotation of the magnetic medium 13, this radial motion allows the magnetic head to travel across all areas of the disk 13 to read and write information on the disk. Each disk 13 preferably includes its own arm/head combination, and each disk may include a plurality of arm/head combinations (one on each side) if the disk is capable of storing information on both sides.

FIG. 1 also shows the R/W IC 20 as used in the present invention to add a dynamically determined overshoot current to a generated square wave current to more accurately control the writing of information to the hard disk 13 via the magnetic head 14. The R/W IC 20 receives write data information from the R/W Channel IC and receives overshoot amplitude and timing information from a processor on the R/W control circuit 11. The R/W IC 20 is then connected, via a plurality of transmission lines 21 to each of the magnetic heads 14 used to write information to the various surfaces of the plurality of hard disk mediums 13. Each transmission line 21 preferably runs along the edge of each arm 18, across the suspension area 19 and into the magnetic head 14, where the combined square wave plus overshoot signal is used to write information to the hard disk medium 13.

Figure 2:
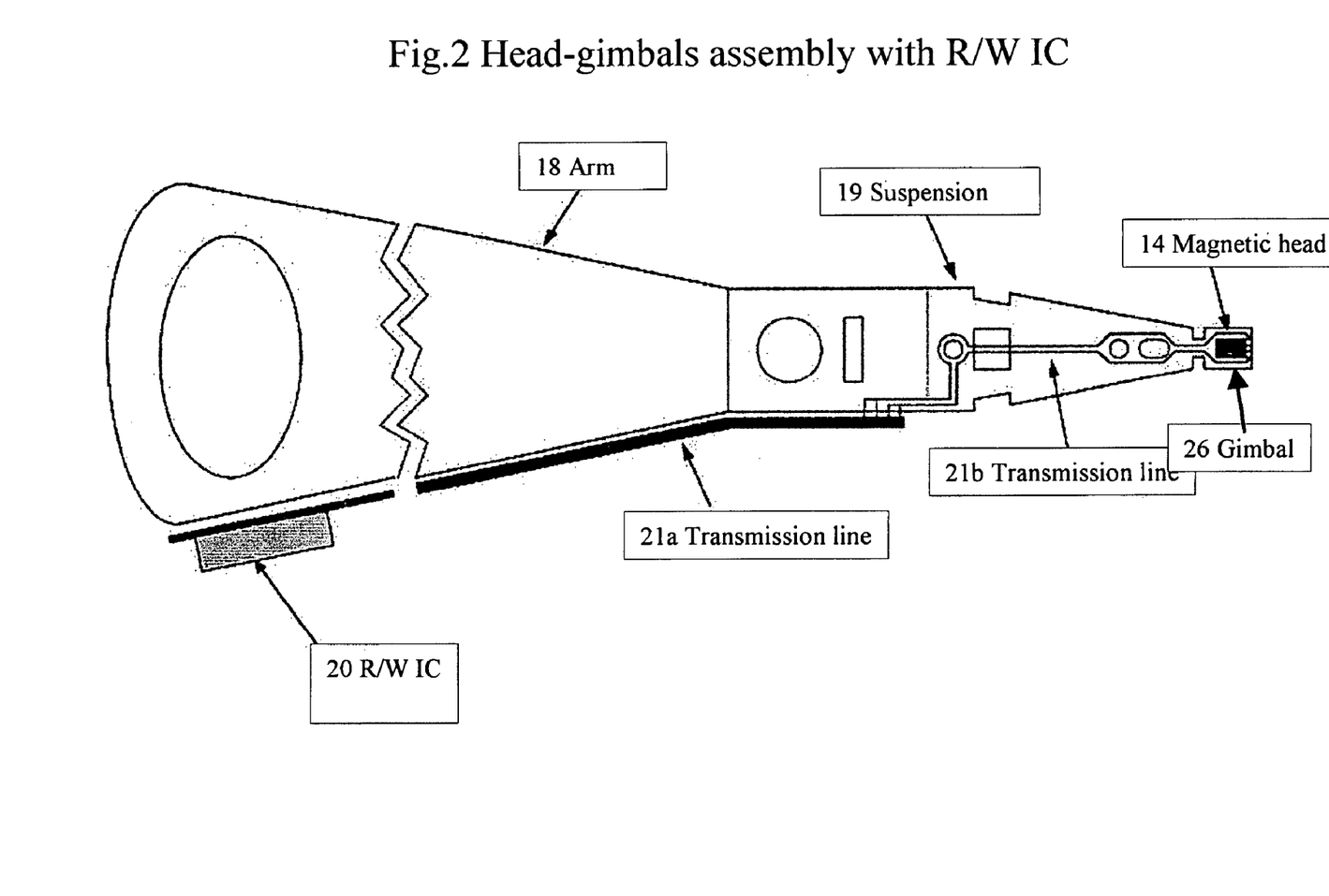
FIG. 2 details an exemplary head-gimbal assembly for use with the present invention.

More specifically, FIG. 2 shows an exemplary hard disk drive head-gimbal assembly with the present R/W IC installed thereon. FIG. 2 includes the arm 18, suspension 19, and magnetic head 14 of a conventional hard disk drive gimbal. Generally, the arm 18 rotates about a shaft (carriage) that allows the magnetic head 14 to move in a radial direction over a hard disk medium. As the medium rotates about it axis (spindle), the magnetic head 14 is therefore able to reach all areas of the magnetic medium to read and write data thereto.

According to the present invention, the R/W IC may be installed on the side of the arm 18, such that it is part of the head-gimbal assembly. The R/W IC preferably receives both the write data from the R/W Channel IC and the overshoot amplitude and timing information from the processor. The R/W IC includes the overshoot current generator, the square wave current generator, and a circuit to combine these two waveforms into the write data current $I_w$. This write data current $I_w$ is then sent through transmission line 21a to the suspension 19 and through transmission line 21b to the write head 14. The write head 14 then applies the write current to the magnetic medium to write data to the medium as described above.

There are many other orientations of the present invention that will be readily apparent to those skilled in the art, and those examples specifically mentioned should not be used to limit the invention thereto. For example, the R/W IC could be located in the R/W control circuit 11 board, and the write current $I_w$ could be transmitted to the write head by a longer transmission line. On the other hand, the W/R Channel IC could be mounted on the suspension. In this case, the transmission line will be shorter.

Also, the reference data table may be stored in a storage medium that is a part of the head-gimbal assembly, or at any other location in the hard disk drive.

Finally, it has been supposed through this disclosure that the ideal current waveform to be provided to the write head is a train of square wave pulses. However, other alternating (repetitive) waveforms could also be used, and different write heads may be designed to perform more accurately or faster with various different write current waveforms. The present invention may be adapted to any alternating or repeating waveform in that is adds a corrective current (e.g., the offshoot current) to the generated "ideal" current to alleviate the loading effects of the changing write head impedance.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Further, one of the embodiment is described by follows. A magnetic recording apparatus, comprising a magnetic recording medium; a magnetic head for applying a recording field to the magnetic medium; and a circuit for supplying alternating current to raise said recording field, wherein said circuit includes means for adding an overshoot current to the alternating current, and means for controlling the timing of adding said overshoot current to said alternating current.

A magnetic recording apparatus according to the paragraph 58, further comprising: a data table which includes a relationship between a frequency of said alternating current and a phase and an amplitude of the overshoot current.

A magnetic recording apparatus according to the paragraph 59, wherein said data table is recorded in a specific area of said magnetic recording medium.

A magnetic recording apparatus according to the paragraph 59, further comprising: a non-volatile memory to store said data table.

A magnetic recording apparatus according to the paragraph 60, further comprising: a register or a memory in which said table is loaded.

A magnetic recording apparatus according to the paragraph 62, wherein a relationship between a load impedance of said magnetic head and a phase and amplitude of an overshoot current is recorded in said data table.

A magnetic recording apparatus, comprising: a plurality of magnetic recording media; a plurality of magnetic heads for applying a recording field to the magnetic recording medium; and a circuit for supplying alternating current to raise said recording field of each magnetic head, wherein said circuit includes means for adding overshoot current to the alternating current, means for controlling the timing of adding said overshoot current to said alternative current, wherein said circuit controls the timing of adding said overshoot current to said alternative current.

A method of controlling a magnetic recording apparatus that generates a recording current to be supplied to a magnetic head, by adding an overshoot current to an alternating current, comprising the steps of: generating a recording current of a predetermined frequency; referring to a data table which describes a relationship between the frequency of said alternating current and a phase and amplitude of an overshoot current; and adding said overshoot current to said alternating current.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A magnetic recording apparatus comprising:
    a magnetic recording medium;
    a magnetic head for applying a recording field to the magnetic medium;
    a circuit for supplying alternating current to raise said recording field, wherein said circuit includes means for adding an overshoot current to the alternating current, and means for controlling the timing of adding said overshoot current to said alternating current; and
    a data table which includes a relationship between a frequency of said alternating current and a phase and an amplitude of the overshoot current.

2. A magnetic recording apparatus according to claim 1, wherein said data table is recorded in a specific area of said magnetic recording medium.

3. A magnetic recording apparatus according to claim 1, further comprising:
    a non-volatile memory to store said data table.

4. A magnetic recording apparatus according to claim 1, further comprising:
    a register or a memory in which said table is loaded.

5. A magnetic recording apparatus according to claim 1, wherein a relationship between a load impedance of said magnetic head and a phase and amplitude of an overshoot current is recorded in said data table.

6. A method of controlling a magnetic recording apparatus that generates a recording current to be supplied to a magnetic head, by adding an overshoot current to an alternating current, comprising the steps of:
    generating alternating current of a predetermined frequency;
    referring to a data table which describes a relationship between the frequency of said alternating current and a phase and amplitude of an overshoot current; and
    adding said overshoot current to said alternating current.

* * * * *